US009867110B2

(12) United States Patent (10) Patent No.: US 9,867,110 B2
Kasslin et al. (45) Date of Patent: Jan. 9, 2018

(54) SERVICE TYPE SELECTION IN WIRELESS NETWORK

(75) Inventors: Mika Kasslin, Espoo (FI); Padam Lal Kafle, Coppell, TX (US); Prabodh Varshney, Coppell, TX (US)

(73) Assignee: Nokia Technologies Oy, Espoo (FI)

( * ) Notice: Subject to any disclaimer, the term of this patent is extended or adjusted under 35 U.S.C. 154(b) by 170 days.

(21) Appl. No.: 14/355,570

(22) PCT Filed: Nov. 4, 2011

(86) PCT No.: PCT/US2011/059353
§ 371 (c)(1),
(2), (4) Date: Apr. 30, 2014

(87) PCT Pub. No.: WO2013/066346
PCT Pub. Date: May 10, 2013

(65) Prior Publication Data
US 2014/0254558 A1 Sep. 11, 2014

(51) Int. Cl.
*H04W 36/00* (2009.01)
*H04W 36/36* (2009.01)
(Continued)

(52) U.S. Cl.
CPC ........... *H04W 36/36* (2013.01); *H04W 48/18* (2013.01); *H04W 16/14* (2013.01)

(58) Field of Classification Search
CPC ....... H04W 88/08; H04W 8/26; H04W 36/00; H04W 72/02; H04W 72/042
(Continued)

(56) References Cited

U.S. PATENT DOCUMENTS 8,750,783 B2 * 6/2014 Koskela ................ H04W 16/14
455/3.01
2005/0030922 A1 2/2005 Lee et al.
(Continued)

FOREIGN PATENT DOCUMENTS

FI WO 2012045908 A1 * 4/2012 ........... H04L 9/3228
WO 2007/076248 A2 7/2007

OTHER PUBLICATIONS

Extended European Search Report received for corresponding European Patent Application No. 11875022.3, dated Jul. 6, 2015, 8 pages.
(Continued)

*Primary Examiner* — Sai Aung
(74) *Attorney, Agent, or Firm* — Harrington & Smith (57) ABSTRACT

This document discloses methods, apparatuses, and computer programs for selecting and providing a terminal apparatus of a wireless network with services. The terminal apparatus selects a wireless apparatus to provide the terminal apparatus with at least a first service. Then, it causes transmission of an association request to the wireless apparatus, wherein the association request comprises at least one information element indicating whether the request relates to provision of the first service without a second service or to provision of both the first service and a second service, wherein the second service is different from the first service and is subjected to the presence of the first service. Upon approval acquired from the wireless apparatus, the at least said first service is received from the wireless apparatus.

22 Claims, 4 Drawing Sheets

(51) Int. Cl.
*H04W 48/18* (2009.01)
*H04W 16/14* (2009.01)

(58) Field of Classification Search
USPC .... 370/338, 329, 331, 330; 455/179.1, 3.01, 455/434, 500
See application file for complete search history.

(56) References Cited

U.S. PATENT DOCUMENTS

| | | | |
|---|---|---|---|
| 2006/0099972 A1* | 5/2006 | Nair | H04W 36/14 455/458 |
| 2007/0117517 A1 | 5/2007 | Hui et al. | |
| 2008/0082830 A1* | 4/2008 | Goulet | H04L 63/0823 713/177 |
| 2008/0112373 A1 | 5/2008 | Shipak | |
| 2008/0172457 A1* | 7/2008 | Chen | H04L 12/2697 709/203 |
| 2010/0177656 A1 | 7/2010 | Kim et al. | |
| 2011/0116458 A1 | 5/2011 | Hsu et al. | |
| 2012/0233635 A1* | 9/2012 | Hakola | H04W 12/02 725/25 |
| 2012/0264440 A1* | 10/2012 | Koskela | H04W 72/042 455/450 |
| 2012/0282959 A1* | 11/2012 | Abraham | H04L 5/0096 455/500 |
| 2013/0231108 A1* | 9/2013 | Kim | H04W 48/16 455/434 |

OTHER PUBLICATIONS

Kafle et al., "TVWS WLAN Enablement—Discussions and Open Issues", IEEE 802.11-10/1056r2, Sep. 10, 2010, pp. 1-30.
International Search Report received for corresponding Patent Cooperation Treaty Application No. PCT/US2011/59353, dated Feb. 15, 2012, 3 pages.
"Second Memorandum Opinion and Order", Federal Communications Commission, FCC 10-174, Unlicensed Operation in the TV Broadcast Bands, Sep. 23, 2010, pp. 1-100.
Abraham et al., "Secure Enablement and CVS without Persistent Association", IEEE 802.11, 11-11-908r1, Jun. 2011, pp. 1-10.
Written Opinion received for corresponding Patent Cooperation Treaty Application No. PCT/US2011/059353, dated Feb. 15, 2012, 6 pages.

* cited by examiner

SERVICE TYPE SELECTION IN WIRELESS NETWORK

RELATED APPLICATION

This application was originally filed as PCT Application No. PCT/US2011/059353 filed Nov. 4, 2011.

FIELD

The invention relates to the field of radio communications and, particularly, to selecting and providing wireless services.

BACKGROUND

In some wireless networks, a terminal device is provided with multiple wireless communication services that may be inter-related. For example, IEEE 802.11 system is being developed to operate on frequency channels that are in principle allocated to a primary system, e.g. a television broadcast system. The IEEE 802.11 may occupy any vacant channels not used by the primary system in a determined geographical area. In order to ensure that an IEEE 802.11 network utilizes only the allowed frequencies and without interference towards the primary system, an IEEE 802.11 device may provide an enablement service together with a data service. Other examples of a wireless apparatus providing a terminal device with a first service together with a second service may also be envisaged.

BRIEF DESCRIPTION

According to an aspect of the present invention, there is provided a method comprising: selecting, by a terminal apparatus, a wireless apparatus of a wireless network to provide the terminal apparatus with at least one of a first service and a second service; transmitting, by the terminal apparatus, an association request to the wireless apparatus, wherein the association request is a request to establish an association between the terminal apparatus and the wireless apparatus and comprises at least one information element indicating one of the following options: the request is to provision the first service without the second service, the request is to provision the second service without the first service, and the request is to provision both the first service and the second service, wherein the at least one information element can be configured to indicate any one of the options; and when the at least one information element indicates that the request is to provision both the first service and the second service, wherein the second service is different from the first service: upon approval acquired from the wireless apparatus, utilizing, by the terminal apparatus, the requested first service and the second service from the wireless apparatus.

According to another aspect of the present invention, there is provided an method including: acquiring, by a wireless apparatus of a wireless network, an association request from a terminal apparatus, wherein the association request is a request to establish an association between the terminal apparatus and the wireless apparatus and comprises an information element indicating one of the following options: the request is to provision the first service without a second service different from the first service, the request is to provision the second service without the first service, and the request is to provision both the first service and the second service, wherein the information element can be configured to indicate any one of the options; and processing the request and identifying, based on the information element, at least one service requested by the terminal apparatus; and when it is identified that the information element indicates that the request is to provision both the first service and the second service, wherein the second service is different from the first service: providing the terminal apparatus with wireless communication services comprising both the first service and the second service requested by the terminal apparatus.

According to another aspect of the present invention, there is provided an apparatus including: at least one processor; and at least one memory including program instructions, wherein the at least one memory and the computer program code are configured, with the at least one processor, to cause the apparatus to: select a wireless apparatus of a wireless network to provide a terminal apparatus with at least one of a first service and a second service; transmit an association request from the terminal apparatus to the wireless apparatus, wherein the association request is a request to establish an association between the terminal apparatus and the wireless apparatus and comprises at least one information element indicating one of the following options: the request is to provision the first service without the second service, the request is to provision the second service without the first service, and the request is to provision both the first service and a second service, wherein the at least one information element can be configured to indicate any one of the options; and when the at least one information element indicates that the request is to provision both the first service and the second service, wherein the second service is different from the first service: upon approval acquired from the wireless apparatus, utilize the requested first service and the second service from the wireless apparatus.

According to yet another aspect of the present invention, there is provided an apparatus including: at least one processor; and at least one memory including program instructions, wherein the at least one memory and the computer program code are configured, with the at least one processor, to cause the apparatus to: acquire, by a wireless apparatus of a wireless network, an association request originated from a terminal apparatus, wherein the association request is a request to establish an association between the terminal apparatus and the wireless apparatus and comprises an information element indicating one of the following options: the request is to provision the first service without a second service different from the first service, the request is to provision the second service without the first service, and the request is to provision both the first service and the second service, wherein the information element can be configured to indicate any one of the options; and process the request and identify, based on the information element, at least one service requested by the terminal apparatus; and when it is identified that the information element indicates that the request is to provision both the first service and the second service, wherein the second service is different from the first service: provide the terminal apparatus with wireless communication services comprising both the first service and the second service requested by the terminal apparatus.

Embodiments of the invention are defined in the dependent claims.

LIST OF DRAWINGS

Embodiments of the present invention are described below, by way of example only, with reference to the accompanying drawings, in which.

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
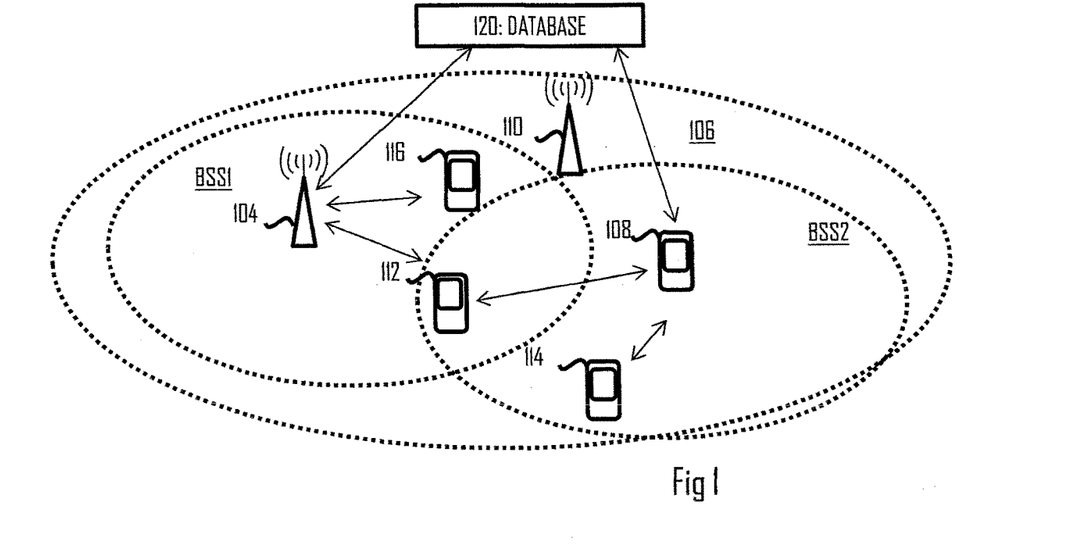
FIG. 1 illustrates a wireless communication scenario to which embodiments of the invention may be applied.

A general architecture of a wireless communication system to which embodiments of the invention may be applied is illustrated in FIG. 1. FIG. 1 illustrates two groups of wireless communication devices forming two basic service sets BSS1 and BSS2, e.g. groups of wireless communication devices comprising an access point (AP) 104, 108 and terminal stations (STA) 112, 114, 116 communicating with the access points 104, 108 of their respective groups. A basic service set (BSS) is a basic building block of an IEEE 802.11 wireless local area network (WLAN). The most common BSS type is an infrastructure BSS that includes a single AP together with all associated STAs. The AP may be a fixed AP as AP 104, or it may be a mobile AP as AP 108. In other embodiments, one of the wireless communication devices may provide a set of other wireless communication devices with services that are the same as or similar to the services provided by the AP, but without the serving wireless communication device being a dedicated AP. The APs 104, 108 may also provide access to other networks, e.g. the Internet. In FIG. 1, the BSS1 and BSS2 form logically separate WLANs that have overlapping coverage areas, as illustrated by dotted lining. For example, a STA 112 resides in a coverage area of both BSSs and, therefore, it may basically operate in either BSS.

The two BSSs may be located in a coverage area of a primary system and configured to operate on frequency channels of the primary system that are currently free in the geographical area of the BSSs. The primary system may be a television (TV) broadcast system comprising a broadcast tower 110 broadcasting television channels on some channels of the common frequency band, and the coverage area 106 of the primary system may overlap with coverage areas of BSS1 and BSS2. The primary system may, however, be any other radio system having a priority over the BSSs to occupy the frequency channels. The BSSs may have secondary access to the frequency channels of the primary system, which means that they must operate under the rules specified by current operational parameters of the primary system so as not to interfere the operation of the primary system. For example, the Federal Communications Commission (FCC) in the United States has issued a report and order (R&O) which permits the use of TV white space (TV WS) spectrum. White space is the term used by the FCC for a TV spectrum which is not being occupied for primary usage e.g. by the TV or wireless microphone transmitters at a given time in a given geographical area. The BSSs forming the secondary system may be configured to utilize available frequency bands of such a spectrum having a frequency band on a very high frequency band (VHF, 30 to 300 MHz), ultra-high frequency band (UHF, 300 to 3000 MHz), and/or other frequency bands. With respect to the networks of the secondary system, the operation of the BSSs may be based on upcoming IEEE 802.11 of specification (specification work on-going) being developed for TV WS band operation, but the system may in some embodiments be based on another specification, e.g. another IEEE 802.11-based network (e.g. IEEE 802.11n, or 802.11ac), IEEE 802.22 specification, Universal Mobile Telecommunication System (UMTS) or any one of its evolution versions (e.g. long-term evolution, LTE, or LTE-Advanced), a system based on International Mobile Telecommunication (IMT) standard or any one of its evolution versions (e.g. IMT-Advanced), Worldwide Interoperability for Microwave Access (Wi-MAX), etc. However, the secondary system is not limited to these examples and it may be any other wireless network within the scope of the present claims. The primary system also need not be a TV broadcast or a wireless microphone transmitter system, and it may be any other system having a frequency band that may be shared with the secondary system. The frequencies may also be available without any assigned primary user, e.g. their utilization may be based on cognitive radio access schemes.

In some embodiments, the primary system has a priority over the frequency bands. The secondary system, e.g. each BSS, may then be configured to dynamically adapt to the spectrum utilization of the primary system and occupy a frequency band not used by the primary system in a given geographical area. In such embodiments, there may be rules for the secondary system to ensure minimization/lack of interference towards the primary system, and these rules may require access to information on free frequency bands in each geographical area and/or sensing and use of specified maximum transmit power levels. Such information on the free frequency bands may be stored in a database 120 to which the access points 104, 108 have access either directly or through an interworking apparatus (not shown) controlling operation of a plurality of networks (BSSs) in a given area. The database 120 may also store the maximum transmit power limits that the BSSs may not exceed so as not to interfere with the users of the primary system.

An operator of the primary system or an authority like a regulator may update the database 120 as the channel allocation of the primary system changes, and the access points 104, 108 may periodically (or constantly or upon notification of a change in the contents of the database) monitor the database 120 for an updated channel allocation and take measures to adjust its own frequency allocation accordingly.

In order to ensure that the interference towards the primary system is suppressed, the BSSs may utilize two-fold connections, wherein a serving apparatus, e.g. an AP, provides a terminal apparatus, e.g. a STA, with at least two separate but linked services: an enablement service and a data service. The enablement service may be used to monitor for activity and to control channel allocation of the terminal apparatus, while the data service may be a conventional wireless data transfer service. The enablement service may be understood as a service that ensures that the terminal apparatus operates on allowed frequency channels and in general within the limits determined for the operation of the secondary system without interfering with the primary system. The FCC has defined the serving apparatus as a fixed device, an enabling device, or a Mode II device having a geolocation and database 120 access capability. The terminal apparatus is defined as a dependent STA or a Mode I device which operates under control of a Mode II personal/portable or a fixed device.

The enablement service may be divided into the following sub-processes: an enablement process, a channel availability query (CAQ) process, and a contact verification signal (CVS) process. The enablement process is designed for Mode I device's FCC ID verification. The enablement process may be followed by the CAQ process in which the Mode I device acquires a list of available channels from the Mode II or fixed device with which the enablement process was carried out. Once the CAQ process has been completed successfully, the Mode I device may be configured to receive a specified CVS periodically, e.g. at least once every 60 seconds, so as to remain enabled and to be able to operate in the TV WS. Under the condition that the enablement service is operational, the Mode I device may conduct data transfer. Accordingly, the data service may be subjected to the presence of the enablement service.

Figure 2:
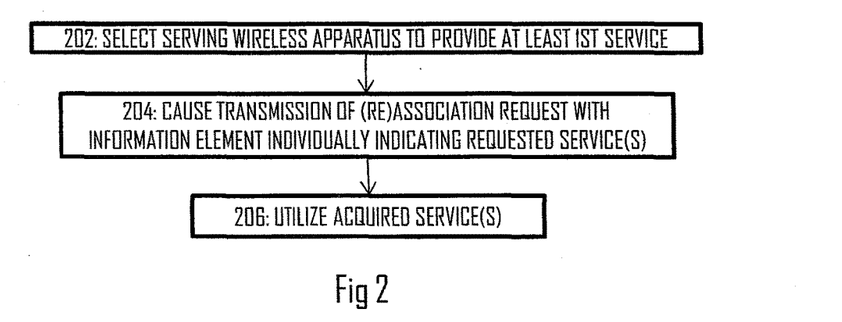
FIGS. 2 and 3 illustrate flow diagrams of processes for requesting and providing a first service and a second service according to some embodiments of the invention.
Figure 3:
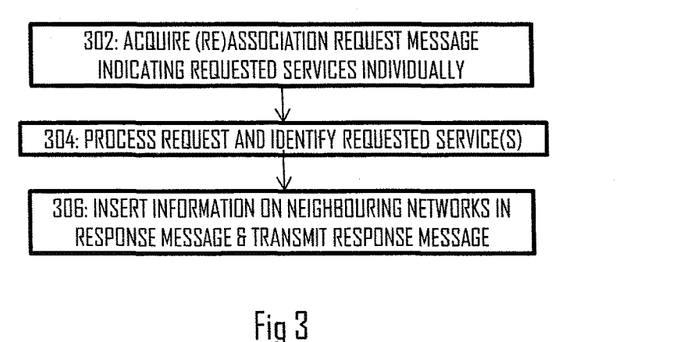

Let us now consider some embodiments of the present invention for requesting and providing a terminal apparatus with a first and a second service. FIG. 2 illustrates a flow diagram of an embodiment of such a process from the point of view of the terminal apparatus requesting for services, and FIG. 3 illustrates a flow diagram of an embodiment of such a process from the point of view of the wireless apparatus providing the terminal apparatus with services. Referring first to FIG. 2, the terminal apparatus selects in block 202 a wireless apparatus of a wireless network to provide the terminal apparatus with at least a first service. In block 204, the terminal apparatus carries out transmission of an association request to the wireless apparatus, wherein the association request comprises at least one information element indicating whether the request relates to provision of the first service without a second service, to provision of the second service without a first service, or to provision of both the first service and a second service. In some embodiments, the association request is a reassociation request. The second service may be different from the first service and it may be subjected to the presence of the first service. Upon approval acquired from the wireless apparatus, the terminal apparatus utilizes requested at least one of said first service and second service from the wireless apparatus in block 206.

Referring to FIG. 3, the wireless apparatus acquires in block 302 the above-mentioned association request from the terminal apparatus, wherein the association request specifies whether the terminal apparatus requests for the first service without the second service, the second service without the first service, or the first service and the second service. In some embodiments, the association request is the reassociation request. The wireless apparatus processes the request in block 304 and identifies the at least one service requested by the terminal apparatus. In block 306, the wireless apparatus provides the terminal apparatus with wireless communication services comprising the at least one service requested by the terminal apparatus. The wireless apparatus providing the services may be considered as a serving wireless apparatus or a serving device as used in the following description, and it may provide also other terminal apparatuses with the first service and/or second service. The definition "serving wireless apparatus" or "serving device" is intended to relate in general to an apparatus having capability to provide terminal apparatuses with at least one of the first service and the second service.

Accordingly, the association request is provided with at least one information element that specifies whether the request relates to providing only the first service, e.g. the enablement service, or both the first service and the second service, e.g. the data service. The services may be mapped also vice versa, i.e. the first service may be the data service and the second service may be the enablement service. It should be appreciated that while the embodiments described herein relate to the enablement service and the data service, the first service and the second service may in principle be any two services the terminal apparatus requests for the serving wireless apparatus to provide. In an embodiment, a condition for the two services may be that they relate to each other on some level, e.g. the second service requires the presence of the first service. Requesting the two services separately enables the terminal apparatus to have the first service from one wireless apparatus and the second service from another wireless apparatus or to have both services from the same wireless apparatus. This type of split service arrangement provides flexibility to the service selection, e.g. the terminal device may select freely and individually the serving wireless apparatus(es) for the first service and the second service.

Figure 4:
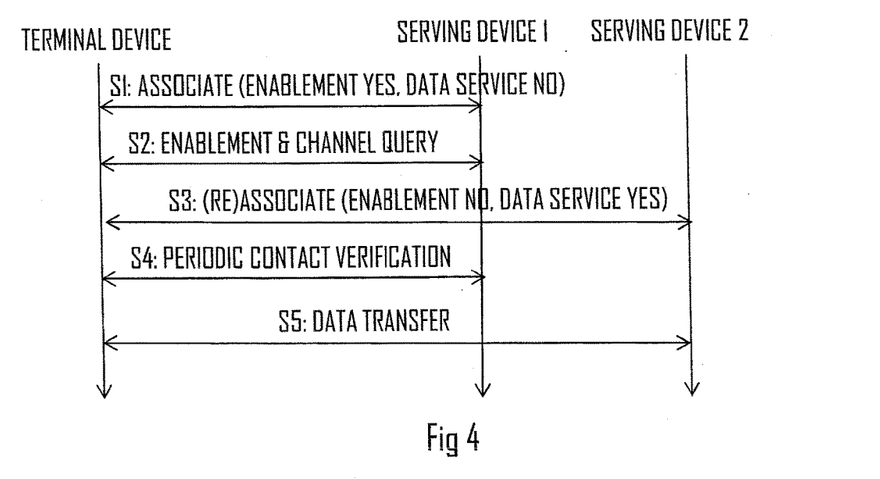
FIG. 4 illustrates a signalling diagram in a process where a terminal device requests a first service from one serving apparatus and another service from another serving apparatus.
Figure 5:
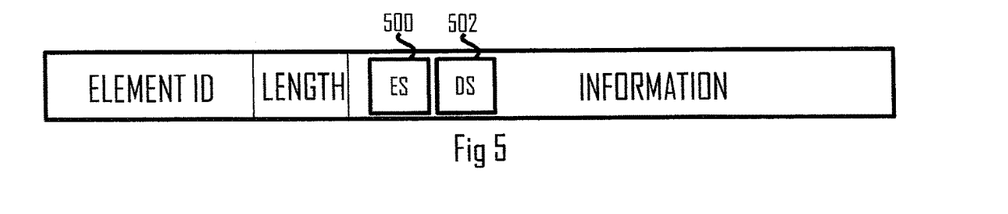
FIG. 5 illustrates an embodiment of an information element for indicating requested services.

Let us now describe some embodiments for requesting the first service and the second service. In the following, the enablement service is used as an example of the first service and the data service is used as an example of the second service. FIG. 4 illustrates a signalling diagram between a terminal device and serving devices 1 and 2. The terminal device may be the STA 112 of FIG. 1, for example. Let us assume an initial situation where the terminal device is in an unassociated state, e.g. it has neither enablement nor data service. In S1 of FIG. 4, the terminal device selects the serving device 1 as the service provider for the enablement service and transmits a first association request to the serving device 1. This first association request may be an enablement association request and, accordingly, the first association request may comprise an information element indicating that the terminal device requests for the enablement service but no data service. In an embodiment, the information element has the structure illustrated in FIG. 5, and the information element may be called "Association Type" information element. Referring to FIG. 5, Element Identifier (ID) field may indicate the type of the information element by having an assigned ID value. The ID value may be unique for the "Association Type" information element. The length field may specify the number of octets in the information field. The information field may have an element-specific structure. In this embodiment, the length of the information field is one octet as specified by the Length field, and the information field is a bit field. The information field may comprise a first sub-element 500 to indicate whether or not the request relates to the provision of the enablement service (ES) and a second sub-element 502 to indicate whether or not the request relates to the provision of the data service (DS). In an embodiment, only two bits are used to indicate the enablement service (ES) and data service (DS), one bit per each service. The bit encoding may be arranged such that bit value "1" is used to indicate the request relates to the service, while bit value "0" is used to indicate that the request is not related to the service. For example, value "1" in the first sub-element (ES) and value "0" in the second sub-element (DS) indicates that the request relates to the provision of the enablement service without the data service.

The information element of FIG. 5 may be included in a conventional association request of an IEEE 802.11 network, for example. Table 1 below shows an embodiment of such an association request comprising the Association Type information element.

TABLE 1

| Frame Control | Duration | DA | SA | BSSID | Sequence Control | Frame Body | FCS |
|---|---|---|---|---|---|---|---|
| 2 | 2 | 6 | 6 | 6 | 2 | 0-2312 | 4 |

A Frame Control field may specify the protocol version and any other conventional frame control information. A Duration field may specify the duration of the association request frame, a destination address (DA) specifies the destination of the association request (the serving device in this example), a source address (SA) specifies the origin of the association request (the terminal device in this example), a BSS identifier field (BSSID) specifies the BSS to which the association request relates, a sequence control field may be used to indicate as a running number the sequence number of the association request frame, a Frame Body contains frame-specific information, and a frame check sequence (FCS) is used for error check. The number below each field represents the length of each field in octets. The Frame Control, Duration, DA, SA, BSSID, and Sequence Control fields may form a medium access control (MAC) header of the association request.

The frame body contains a variable number of fixed fields (Capability information and Listen interval) and information elements. Fixed fields may be configured to have no header but they may have one information field of fixed size. Information elements may have a two octet header indicating element type and length, as shown for the Association Type information element in FIG. 5. Table 2 below shows an example of the Frame Body field of the association request.

TABLE 2

| Order | Information | Notes |
|---|---|---|
| 1 | Capability | |
| 2 | Listen Interval | |
| 3 | SSID | |
| 4 | Supported rates | |
| 5 | Extended supported rates | The Extended supported rates element is present whenever there are more than 8 supported rates, and is optional otherwise |
| 6 | Power capability | The Power capability element is present if dot11SpectrumManagementRequired is true |
| 7 | Supported channels | The Supported channels element is present if dot11SpectrumManagementRequired is true |
| 8 | RSN | The RSN information element is only present within Association request frames generated by STAs that have dot11RSNAEnabled set to true |
| 9 | QoS capability | The QoS capability element is present when dot11QosOptionImplemented is true |

TABLE 2-continued

| Order | Information | Notes |
|---|---|---|
| 10 | Association Type | Indicates whether the Association relates to enablement and/or data service |
| Last | Vendor specific | One or more vendor-specific information elements may appear in this frame. This information element follows all other information elements. |

As shown in FIG. 5 and in Tables 1 and 2, the service split between the enablement service and the data service may be implemented in the protocol messages, e.g. the association request, wherein the protocol message indicate separately whether or not the request is for the enablement service and whether or not the request is for the data service. All the bits in the Association Type information element may be set independently, e.g. each service may be indicated independently.

Upon reception of the association request in S1, the serving device 1 extracts the message and determines from the Association Type information element the service(s) the terminal device is requesting. The serving device 1 may acknowledge the request by transmitting an association response frame that may also contain the Association Type information element shown above. The serving device 1 may copy the contents of the Association type information element from the association request to the association response. In other embodiments, the Association Type information element is omitted from the association response frame.

After the association request of S1 has been approved by the serving device 1, the terminal device and the serving device 1 may carry out the enablement procedure (S2) in which the terminal device may be authenticated and any required security keys may be exchanged. The enablement may be followed by the above-mentioned channel query procedure in which the terminal device may query for the frequency channels that are allowed to be used in the geographical area of the BSS of the serving device 1.

In S3, the terminal device selects a serving device 2 to provide the terminal device with the data service. The terminal device may determine on the basis of passive or active scanning that the serving device 2 is more suitable for the data service than the serving device 1, or the selection may be made on other basis. As a consequence, the terminal carries out another association, wherein this other association relates to the provision of the data service. This association may be considered to be a reassociation of the data service. In S3, the terminal device transmits a second association request which is addressed to the serving device 2. The second association request may have a format similar to the first association request transmitted in S1, and the second association request may also comprise the Association Type information element. The second association request may specify that the terminal device requests the serving device 2 to provide the terminal device with the data service and no enablement service. The second association request may, however, be a reassociation request which is logically different from the association request but which comprises the Association Type information element. The serving device 2 may acknowledge the provision of the data service by transmitting the association response message and, thereafter, carrying out any required authentication and association procedures needed for the data service.

The enablement service provided by the serving device 1 may be carried out on the background during the data service association. As mentioned above, the enablement service may comprise the exchange of the periodic CVS (S4) in which the serving device 1 may transmit the CVS and the terminal device should acknowledge the reception of the CVS. If the serving device 1 does not receive the acknowledgment for the CVS, or if the terminal device specifically requests for the dissociation of the enablement service, the serving device may terminate the enablement service. The serving device 1 may maintain a timer for each terminal device it enables, and the serving device 1 must receive an acknowledgment for the CVS frame or, otherwise, the enablement service with the non-responding terminal device may be terminated. To terminate the enablement relationship with the serving device 1, the terminal device may as well send a deenablement message that may be indicated by a flag in frames used for CVS or CAQ messages. The termination of the enablement may result in that the terminal device cannot use the data service, if the data service is dependent on the presence of the enablement service. The data service association may, however, be maintained until the enablement has been re-established. While the enablement service is being provided between the terminal device and the serving device 1 in S4, the data transfer may be carried out between the terminal device and the serving device 2 in S5.

Figure 6:
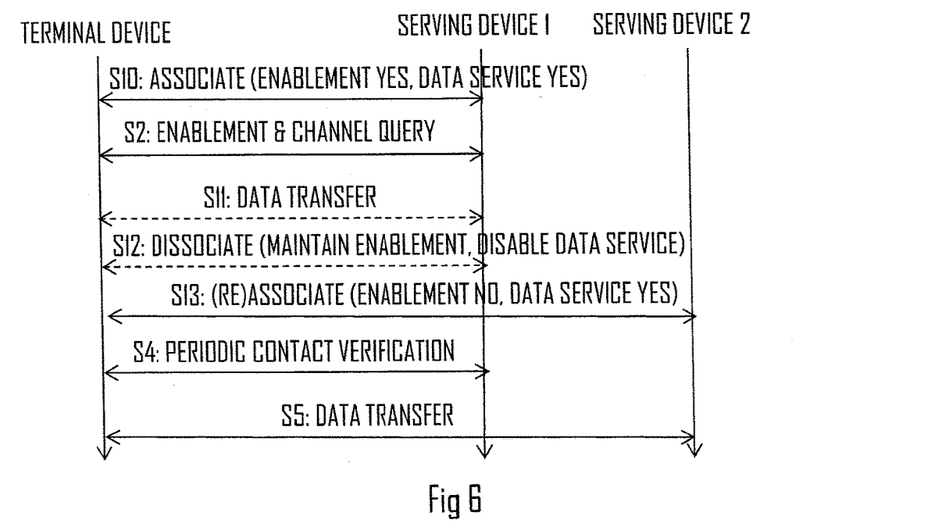
FIGS. 6 and 7 illustrate signalling diagrams for requesting a providing services according to further embodiments of the invention.

FIG. 4 illustrates an embodiment where the terminal device requests for provision each service separately: the first service is requested without the second service from the serving device 1, while the second service is requested without the first service from the serving device 2. FIG. 6 illustrates another embodiment where the terminal device establishes both the first service and the second service with one serving device by using a single association request message and, thereafter, it carries out a reassociation procedure in which one of the services is transferred to another serving device while the other service is maintained in the initial serving device. In FIG. 6, the procedures denoted by the same reference signs as in FIG. 4 illustrate the same or similar procedures as in FIG. 4.

Referring to FIG. 6, the terminal device selects the serving device 1 as the service provider for both the enablement service and the data service and transmits an association request to the serving device 1. The association request may comprise an information element indicating that the terminal device requests for the enablement service and the data service (S10). As mentioned above, the serving device 1 may respond to the association request by transmitting the association response. Assuming that the serving device 1 approves the requested services, the enablement service may be established in S2, as described above. The data service may also be established, and data may be transferred between the terminal device and the serving device in S11. S11 may, however, be omitted. In S12, which is an optional step, the terminal device carries out a dissociation process with the serving device 1 so as to dissociate one of the provided services. In this example, let us assume that the terminal device dissociates the data service but maintains the enablement service. The terminal device may transmit in S12 a dissociation request which may be a conventional dissociation request message equipped with the above-mentioned information element indicating the service(s) to be dissociated. The information element may be similar to the Association Type information element described above. Upon reception of the dissociation request, the serving device 1 may carry out a dissociation procedure with the terminal device so as to terminate the data service.

In S13, the terminal device may select the serving device 2 to provide the terminal device with the data service and it transmits an association request to the serving device 2. If the dissociation of the data service is carried out in S12, the association request may be the above-mentioned association request. It may be understood that the data service is then first released and then re-established. If S12 is omitted, the association request may be a reassociation request requesting for a transfer of the data service from one serving device to another. The reassociation request may have a format similar to the association request, or it may have other information elements. Table 3 below shows an embodiment of the reassociation request comprising the above-mentioned fields of the association request and, additionally, a Current AP Address field comprising an address of the serving device 1 that previously provided the service. The serving device 2 may use the address of the serving device 1 to exchange any parameters related to the service that is being reassociated with the serving device 1 over a backbone interface between the serving devices 1 and 2. The reassociation request may comprise the above-mentioned Association Type field to indicate separately whether the request concerns the enablement service and/or the data service. In this example, the reassociation request may specify that the request concerns only the data service. Then, the data service association may be carried out between the terminal device and the serving device 2 in the above-described manner, and the result is that the serving device 1 provides the terminal device with the enablement service comprising the periodic contact verification (S4), while the serving device 2 provides the terminal device with the data service comprising data transfer (S5).

TABLE 3

| Order | Information | Notes |
|---|---|---|
| 1 | Capability | |
| 2 | Listen Interval | |
| 3 | Current AP Address | |
| 4 | SSID | |
| 5 | Supported rates | |
| 6 | Extended supported rates | The Extended supported rates element is present whenever there are more than 8 supported rates, and is optional otherwise |
| 7 | Power capability | The Power capability element is present if dot11SpectrumManagementRequired is true |
| 8 | Supported channels | The Supported channels element is present if dot11SpectrumManagementRequired is true |
| 9 | RSN | The RSN information element is only present within Association request frames generated by STAs that have dot11RSNAEnabled set to true |
| 10 | QoS capability | The QoS capability element is present when dot11QosOptionImplemented is true |
| 111 | Association Type | Indicates whether the Association relates to enablement and/or data service |
| Last | Vendor specific | One or more vendor-specific information elements may appear in this frame. This information element follows all other information elements. |

Figure 7:
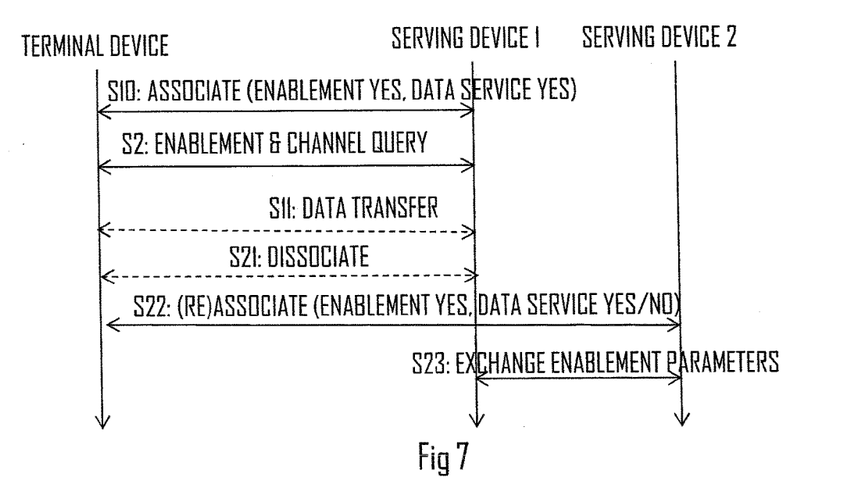

In the embodiment illustrated in FIG. 7, the enablement service is transferred and the data service is maintained in the initial serving device. The steps with the same reference signs as in FIGS. 4 and 6 represent the same or similar procedures. Accordingly, the terminal device first carries out an association procedure with the serving device 1 such that the serving device 1 becomes the provider of both the enablement service and the data service (S10). In an optional step S21, the terminal device carries out dissociation of at least the enablement service and, optionally, the data service. The dissociation may be carried out in the above-described manner, and the service(s) requested to be dissociated may be released. In an embodiment, the dissociation of the enablement service may be requested by including in a CVS and/or CAQ message an information element that indicates the requested dissociation of the enablement service. In another embodiment, the information element also indicates whether or not the data service is also being requested to be dissociated. In such embodiments, the information element may have a similar format as the Association Type information element.

After the dissociation, the terminal device may carry out an association of at least the enablement service with the serving device 2 in S22. The association may be carried out as an initial association, if S21 is carried out. However, if S21 is omitted, the association may be the reassociation related to transferring at least the enablement service. The (re)association request may comprise the above-mentioned information element indicating the serving device 1 that previously provided the enablement service. Accordingly, the serving device 2 may negotiate in S23 with the serving device 1 over a backbone interface between APs, for example, in order to receive at least some of the parameters of the previously provided enablement service, e.g. terminal device's enablement status, device's FCC ID verification status indicating whether or not the terminal device's FCC ID is still valid and for how long or whether it should be re-verified, FCC ID verification validity period defining a timing for re-verifying the FCC ID or a timing of the last verification of the FCC ID, and any cryptographic keys used for the CVS encryption. As a result, the enablement may be carried out in an expedited manner, and at least some of the parameters may be transferred from the old enablement service to the new enablement service. If the data service is also transferred, the transfer of the data service may be carried out in a conventional manner. However, if the data service is maintained in the serving device 1, the data service may be suspended for the duration the enablement service is not present. It may not be necessary to dismantle the data service because of the transfer of the enablement service.

As mentioned above, the dissociation in S12 and S21 is omitted in some embodiments and the terminal device may transmit the reassociation request to the serving device 2 without first carrying out the dissociation. In some embodiments, the terminal device and the serving devices are configured not to use the dissociation requests at all, while in other embodiments the terminal device and the serving device are configured to use the dissociation and the new association under some conditions, while the reassociation may be used under other conditions. The terminal device may indicate in the (re)association request the serving device 1 currently or previously providing the service requested to be (re)associated, e.g. it may include in the (re)association request an identifier of the serving device 1. Then, the new serving device 2 may communicate with the current serving device 1 so as to transfer the association of the service from the serving device 1 to the serving device 2. As a consequence, the dissociation with the serving device 1 may be carried out without the terminal device explicitly requesting for the dissociation before the reassociation.

The enablement service gives a terminal a chance to securely associate with an enabling device, e.g. an enabling AP, so as to be provided with the enablement and all the related regulatory processes. The enablement association may be arranged not to provide the terminal device with distribution services and, thus, no normal data communication through the enabling device is possible, unless the enabling device provides also the data service.

The data service association may be a conventional data transfer association that provides the terminal device with secure association with a serving device, e.g. a serving AP, providing the data distribution services. Upon a successful data service association, the terminal device may carry out all data communication through the serving AP. Once the association is torn down, the relationship between the terminal and the serving AP may also be removed immediately.

Both the enablement association and the data service association may be requested simultaneously with a single request message, and they may be provided by the same serving device. In that case, the same serving device, e.g. an AP, functions as both an enabling device and the data servicing device. The terminal device may at any time tear down the data service association without any modification to the enablement association. If both associations are torn down at same time, the relationship between the serving device and the terminal device may also be torn down.

When the association request concerns only the enablement service, the serving device may provide the terminal device with an initial enablement of both the enablement service and the data service upon request, and it may provide information on available channels as a part of the enablement. The terminal device may then dissociate from the serving device with the indication that it just would like to remain enabled through the serving device after the dissociation. The enablement service responsibility in the serving device may after the dissociation only involve the CVS and/or CAQ procedures.

In general, the terminal device may communicate with the serving device providing the enablement service on a channel other than the channel used for communicating with the serving device providing the terminal device with the data service. During the initial enablement procedure, the terminal device may receive the list of available channel from the enabling device. Hence, the terminal device may use any one or more of those channels to associate with the serving device for the data service. Obviously, the serving devices may operate on the same channel.

Figure 8:
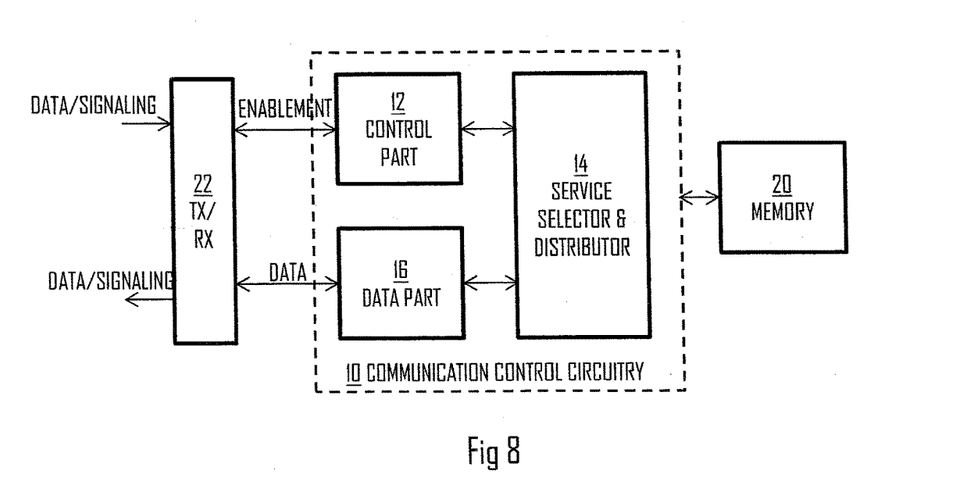
FIGS. 8 and 9 illustrate block diagrams of apparatuses according to some embodiments of the invention.

FIG. 8 illustrates an embodiment of an apparatus comprising means for carrying out the above-mentioned functionalities of the terminal apparatus configured to individually select and request for the first service and the second service. The apparatus may be a communication apparatus of an IEEE 802.11 network or another wireless network, e.g. a STA. The apparatus may be a computer (PC), a laptop, a tablet computer, a cellular phone, a palm computer, a dongle, or any other apparatus provided with radio communication capability. In another embodiment, the apparatus is comprised in such a communication apparatus, e.g. the apparatus may comprise a physical circuitry, e.g. a chip, a processor, a micro controller, or a combination of such circuitries in the terminal apparatus.

The apparatus may comprise a communication controller circuitry 10 configured to control the communications in the terminal apparatus. The communication controller circuitry 10 may comprise a control part 12 handling control signalling communication with respect to transmission, reception, and extraction of control frames including the association request messages, the reassociation request messages, and the association response messages, as described above. The control part 12 may be configured to handle the operation of the first service, e.g. the enablement service, in the terminal apparatus. The communication controller circuitry 10 may further comprise a data part 16 that handles transmission and reception of payload data in connection with data services. The data part 16 may be configured to handle the operation of the second service, e.g. the data service, in the terminal apparatus after the control part 12 has established the data service with a wireless apparatus. The communication controller circuitry 10 may further comprise a service selector and distributor (SSD) circuitry 14 configured to carry out the individual selection of the service provider for the first service and the second service and to control the control part 12 to request for the corresponding services from the selected wireless apparatus(es). The SSD circuitry 14 may select a different wireless apparatus for the different services, and the selection of the service providers may be made according to conventional techniques, e.g. a wireless apparatus providing the highest data rates may be selected as the data service provider, while a wireless apparatus assumed to provide a long and stable enablement, e.g. a fixed AP, may be selected as the enablement provider.

The circuitries 12 to 16 of the communication controller circuitry 10 may be carried out by the one or more physical circuitries or processors. In practice, the different circuitries may be realized by different computer program modules. Depending on the specifications and the design of the apparatus, the apparatus may comprise some of the circuitries 12 to 16 or all of them.

A memory 20 may store computer programs (software) configuring the apparatus to perform the above-described functionalities of the terminal apparatus. The memory 20 may also store communication parameters and other information needed for the wireless communications, e.g. the list of available channels acquired through the CAQ procedure. The apparatus may further comprise radio interface components 22 providing the apparatus with radio communication capabilities within the BSS and/or with other BSSs. The radio interface components 22 may comprise standard well-known components such as amplifier, filter, frequency-converter, (de)modulator, and encoder/decoder circuitries and one or more antennas. The radio interface components 22 may be configured to provide the terminal apparatus with a capability of operating simultaneously on a plurality of frequency channels so as to realize the situation where the first service and the second service are operated on different channels. The apparatus may further comprise a user interface enabling interaction with the user of the communication device. The user interface may comprise a display, a keypad or a keyboard, a loudspeaker, etc.

In an embodiment, the apparatus carrying out the embodiments of the invention in the terminal apparatus comprises at least one processor and at least one memory including a computer program code, wherein the at least one memory and the computer program code are configured, with the at least one processor, to cause the apparatus to carry out the functionality of the terminal apparatus or the terminal device in any one of the processes of FIGS. 2 and 4 to 7. Accordingly, the at least one processor, the memory, and the computer program code form processing means for carrying out embodiments of the present invention in the terminal apparatus selecting and requesting for the services.

Figure 9:
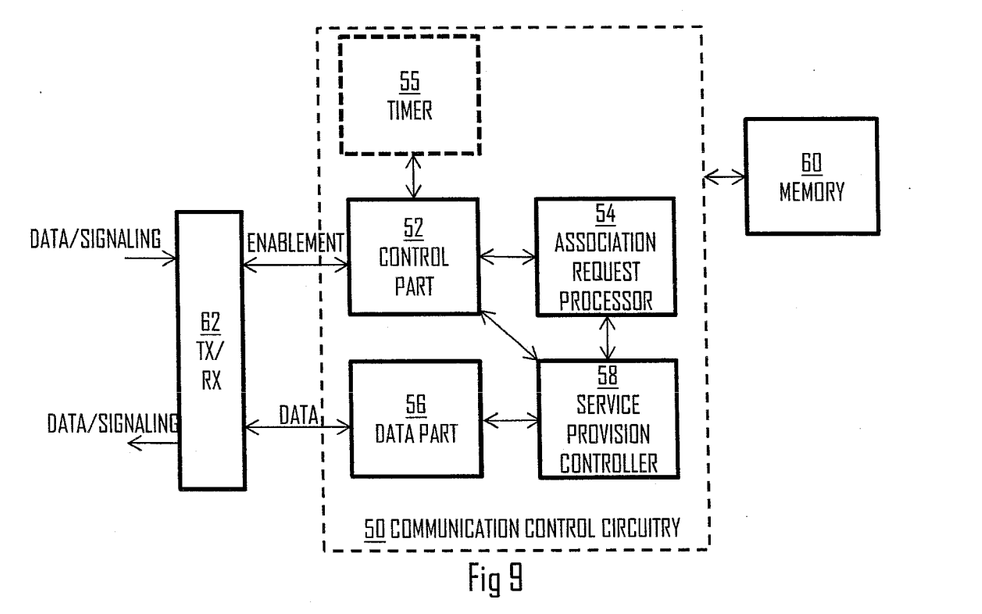

FIG. 9 illustrates an embodiment of an apparatus comprising means for carrying out the above-mentioned functionalities of the wireless apparatus configured to receive and process association request messages and to provide terminal apparatuses with at least one of said first service and second service. The apparatus may be a communication apparatus of an IEEE 802.11 network or another wireless network, e.g. an AP. The apparatus may be a computer (PC), a laptop, a tablet computer, a cellular phone, a palm computer, a dongle, or any other apparatus provided with radio communication capability. In another embodiment, the apparatus is comprised in such a communication apparatus, e.g. the apparatus may comprise a physical circuitry, e.g. a chip, a processor, a micro controller, or a combination of such circuitries in the wireless apparatus.

The apparatus may comprise a communication controller circuitry 50 configured to control the communications in the communication apparatus. The communication controller circuitry 50 may comprise a control part 52 handling control signalling communication with respect to transmission, reception, and extraction of control frames including the association request messages, the reassociation request messages, and the association response messages, as described above. The control part 52 may establish and operate the first services, e.g. the enablement procedures comprising the CVS and CAQ processes. The apparatus may comprise a timer 55 configured to measure the time for the CVS process, e.g. the time during which the terminal should show activity in the CVS process. The communication controller circuitry 50 may further comprise a data part 56 that handles transmission and reception of payload data in connection with data services. The data part 56 may operate the second services. The communication controller circuitry 50 may further comprise an association request processor 54 configured to receive the (re)association requests originated from the terminal apparatuses, extract the (re)association requests and identify the requested service(s). Then, the association request processor 54 may output an indication of the requested service(s) to a service provision controller 58 carrying out overall control of the services provided by the wireless apparatus. For example, upon reception of the reassociation request for the enablement service, the service provision controller 58 may identify the wireless apparatus that currently provides the enablement service and to control the control part 52 to retrieve any necessary enablement parameters from the previous wireless apparatus so as to expedite the enablement. Upon reception of the association request for the data service, the service provision controller 58 may instruct the data part 56 to carry out the establishment procedures required for setting up the data service and to operate the data service.

The circuitries 52 to 58 of the communication controller circuitry 50 may be carried out by the one or more physical circuitries or processors. In practice, the different circuitries may be realized by different computer program modules. Depending on the specifications and the design of the apparatus, the apparatus may comprise some of the circuitries 52 to 58 or all of them.

The apparatus may further comprise a memory 60 to store computer programs (software) configuring the apparatus to perform the above-described functionalities of the wireless apparatus. The memory 60 may also store communication parameters and other information needed for the wireless communications, e.g. the database storing information on the present neighbouring networks and their operational parameters, e.g. available operating channels as acquired from the database 120 and identities and security information of served terminal apparatuses. The apparatus may further comprise radio interface components 62 providing the apparatus with radio communication capabilities within the BSS and/or with other BSSs. The radio interface components 62 may comprise standard well-known components such as amplifier, filter, frequency-converter, (de)modulator, and encoder/decoder circuitries and one or more antennas. The apparatus may further comprise a user interface enabling interaction with the user of the communication device. The user interface may comprise a display, a keypad or a keyboard, a loudspeaker, etc.

In an embodiment, the apparatus carrying out the embodiments of the invention in the communication apparatus comprises at least one processor and at least one memory including a computer program code, wherein the at least one memory and the computer program code are configured, with the at least one processor, to cause the apparatus to carry out the functionality of the serving device in any one of the processes of FIGS. 3 to 7. Accordingly, the at least one processor, the memory, and the computer program code form processing means for carrying out embodiments of the present invention in the apparatus functioning in the serving device.

As used in this application, the term "circuitry" or "controller" refers to all of the following: (a) hardware-only circuit implementations, such as implementations in only analog and/or digital circuitry, and (b) to combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) to circuits, such as a 3o microprocessor(s) or a portion of a microprocessor(s), that require software or firmware for operation, even if the software or firmware is not physically present.

This definition of circuitry or controller applies to all uses of this term in this application. As a further example, as used in this application, the term circuitry would also cover an implementation of merely a processor (or multiple processors) or portion of a processor and its (or their) accompanying software and/or firmware. The term "circuitry" would also cover, for example and if applicable to the particular element, a baseband integrated circuit or applications processor integrated circuit for a portable device or another network device.

The processes or methods described in FIGS. 2 to 7 may also be carried out in the form of a computer process defined by a computer program. The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

The present invention is applicable to wireless networks defined above but also to other suitable communication systems. The protocols used, the specifications of mobile telecommunication systems, their network elements and terminals, develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method comprising:
    selecting, by a terminal apparatus, a wireless apparatus of a wireless network to provide the terminal apparatus with at least one of a first service and a second service;
    transmit, by the terminal apparatus, an association request to the wireless apparatus, wherein the association request is a request to establish an association between the terminal apparatus and the wireless apparatus and comprises at least one information element indicating one of the following options:
        the request is to provision the first service without the second service,
        the request is to provision the second service without the first service, and
        the request is to provision both the first service and the second service; and
    when the information element indicates that the request is to provision both the first service and the second service, wherein the second service is different from the first service:
        upon approval acquired from the wireless apparatus, utilizing, by the terminal apparatus, the requested first service and the second service from the wireless apparatus.

2. The method of claim 1, wherein the provision of the terminal apparatus with the second service is subjected to the provision of the terminal apparatus with the first service.

3. The method of claim 1, wherein the first service is an enablement service enabling the terminal apparatus to transfer data in the wireless network, and wherein the second service is a data transfer service.

4. The method of claim 3, wherein the enablement service is used for ensuring that the operation of the data service does not interfere with a primary system having a priority to operating frequencies of the wireless network.

5. The method of claim 1, further comprising: causing transmission of a dissociation request to the wireless apparatus, the dissociation request comprising an information element indicating whether the request is to release only one of the first service and the second service or to release of both the first service and the second service.

6. The method of claim 1, wherein the association request is a reassociation request related to transferring at least one of the first service and the second service from another wireless apparatus to said wireless apparatus.

7. A method comprising:
    acquiring, by a wireless apparatus of a wireless network, an association request from a terminal apparatus, wherein the association request is a request to establish an association between the terminal apparatus and the wireless apparatus and comprises an information element indicating one of the following options:
        the request is to provision the first service without a second service different from the first service,
        the request is to provision the second service without the first service, and
        the request is to provision both the first service and the second service; and
    processing the request and identifying, based on the information element, at least one service requested by the terminal apparatus; and
    when it is identified that the information element indicates that the request is to provision both the first service and the second service, wherein the second service is different from the first service:
        providing the terminal apparatus with wireless communication services comprising both the first service and the second service requested by the terminal apparatus.

8. The method of claim 7, wherein the provision of the terminal apparatus with the second service is subjected to the provision of the terminal apparatus with the first service.

9. The method of claim 7, wherein the first service is an enablement service enabling the terminal apparatus to transfer data in the wireless network, and wherein the second service is a data transfer service.

10. The method of claim 7, further comprising: acquiring a dissociation request originated from the terminal apparatus, the dissociation request comprising an information element indicating whether the request is to release only the first service, to release of only the second service, or to release of both the first service and the second service.

11. The method of claim 7, wherein the association request is a reassociation request related to transferring at least one of the first service and the second service from another wireless apparatus to said wireless apparatus.

12. An apparatus comprising: at least one processor; and at least one memory including program instructions, wherein the at least one memory and the computer program code are configured, with the at least one processor, to cause the apparatus to:
select a wireless apparatus of a wireless network to provide a terminal apparatus with at least one of a first service and a second service;
cause transmission of transmit an association request from the terminal apparatus to the wireless apparatus, wherein the association request is a request to establish an association between the terminal apparatus and the wireless apparatus and comprises at least one information element having a value,
wherein the at least one information element comprises indicating one of the following options:
the request is to provision the first service without the second service,
the request is to provision the second service without the first service, and
the request is to provision both the first service and a second service; and
when the at least one information element indicates that the request is to provision both the first service and the second service, wherein the second service is different from the first service:
upon approval acquired from the wireless apparatus, utilize the requested first service and the second service from the wireless apparatus.

13. The apparatus of claim 12, wherein the provision of the terminal apparatus with the second service is subjected to the provision of the terminal apparatus with the first service.

14. The apparatus of claim 12, wherein the first service is an enablement service enabling the terminal apparatus to transfer data in the wireless network, and wherein the second service is a data transfer service.

15. The apparatus of claim 14, wherein the at least one memory and the computer program code are configured, with the at least one processor, to cause the apparatus to use the enablement service for ensuring that the operation of the data service does not interfere with a primary system having a priority to operating frequencies of the wireless network.

16. The apparatus of claim 12, wherein the at least one memory and the computer program code are configured, with the at least one processor, to cause the apparatus to cause transmission of a dissociation request to the wireless apparatus, the dissociation request comprising an information element indicating whether the request is to release only one of the first service and the second service or to release of both the first service and the second service.

17. The apparatus of claim 12, wherein the association request is a reassociation request related to transferring at least one of the first service and the second service from another wireless apparatus to said wireless apparatus.

18. An apparatus comprising: at least one processor; and at least one memory including program instructions, wherein the at least one memory and the computer program code are configured, with the at least one processor, to cause the apparatus to:
acquire, by a wireless apparatus of a wireless network, an association request originated from a terminal apparatus, wherein the association request is a request to establish an association between the terminal apparatus and the wireless apparatus and comprises an information element indicating one of the following options:
the request is to provision the first service without a second service different from the first service,
the request is to provision the second service without the first service, and
the request is to provision both the first service and the second service; and
when the information element indicates that the request is to provision both the first service and the second service, wherein the second service is different from the first service:
process the request and identify, based on the information element, at least one service requested by the terminal apparatus; and
when it is identified that the information element indicates that the request is to provision both the first service and the second service, wherein the second service is different from the first service:
provide the terminal apparatus with wireless communication services comprising both the first service and the second service requested by the terminal apparatus.

19. The apparatus of claim 18, wherein the provision of the terminal apparatus with the second service is subjected to the provision of the terminal apparatus with the first service.

20. The apparatus of claim 18, wherein the first service is an enablement service enabling the terminal apparatus to transfer data in the wireless network, and wherein the second service is a data transfer service.

21. The apparatus of claim 18, wherein the at least one memory and the computer program code are configured, with the at least one processor, to cause the apparatus to:
acquire a dissociation request originated from the terminal apparatus, the dissociation request comprising an information element indicating whether the request is to release only the first service, to release of only the second service, or to release of both the first service and the second service.

22. The apparatus of claim 18, wherein the association request is a reassociation request related to transferring at least one of the first service and the second service from another wireless apparatus to said apparatus.

* * * * *

UNITED STATES PATENT AND TRADEMARK OFFICE
CERTIFICATE OF CORRECTION

| | |
|---|---|
| PATENT NO. | : 9,867,110 B2 |
| APPLICATION NO. | : 14/355570 |
| DATED | : January 9, 2018 |
| INVENTOR(S) | : Mika Kasslin, Padam Lal Kafle and Prabodh Varshney |

It is certified that error appears in the above-identified patent and that said Letters Patent is hereby corrected as shown below:

In the Claims

In Claim 1:
Column 16, Line 13, "the information" should be deleted and --the at least one information-- should be inserted.

In Claim 12:
Column 17, Line 23, "cause transmission of" should be deleted.
Column 17, Lines 28-29, "having a value, wherein the at least one information element comprises" should be deleted.

In Claim 18:
Column 18, Lines 26-28, "when the information element indicates that the request is to provision both the first service and the second service, wherein the second service is different from the first service:" should be deleted.

Signed and Sealed this
Twenty-fourth Day of April, 2018

Andrei Iancu
*Director of the United States Patent and Trademark Office*